March 30, 1943.   G. N. PIFER   2,315,452
PHOTOGRAPHING APPARATUS
Filed March 21, 1940   3 Sheets-Sheet 1

INVENTOR.
GEORGE N. PIFER
BY
Kwis Hudson & Kent
ATTORNEYS

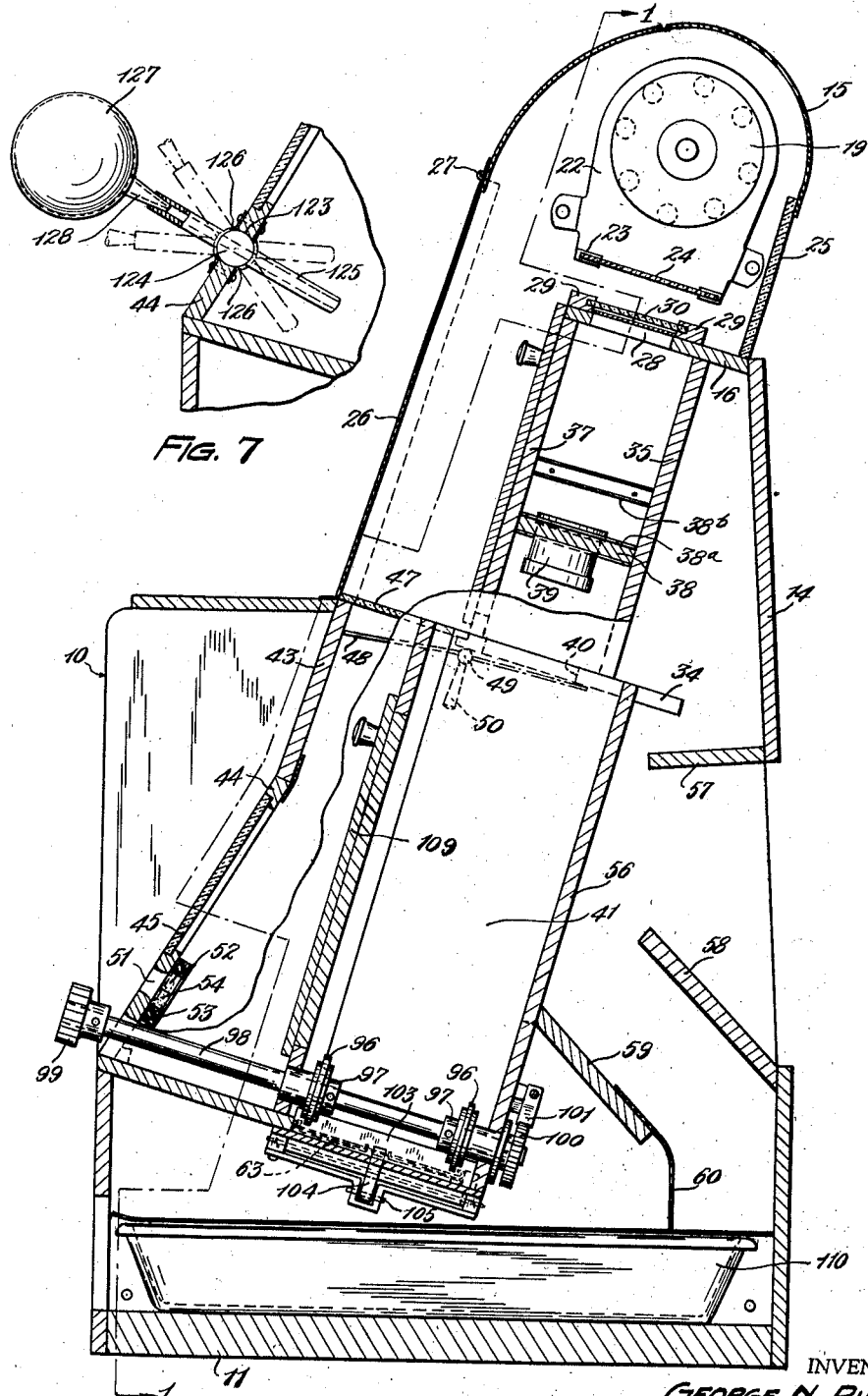

March 30, 1943.    G. N. PIFER    2,315,452
PHOTOGRAPHING APPARATUS
Filed March 21, 1940    3 Sheets-Sheet 3

INVENTOR.
GEORGE N. PIFER
BY
ATTORNEYS

Patented Mar. 30, 1943

2,315,452

UNITED STATES PATENT OFFICE 2,315,452

PHOTOGRAPHING APPARATUS

George N. Pifer, Cleveland Heights, Ohio

Application March 21, 1940, Serial No. 325,221

9 Claims. (Cl. 88—24)

This invention relates to a photographing apparatus, and particularly to an apparatus for enlarging photographs and for developing such enlargements directly in the apparatus.

The main object of the invention is to provide a photographing apparatus in which photographs can be enlarged and directly developed and which apparatus is so constructed that it is portable and can be positioned in any convenient place to carry out the making of the enlargements and the development thereof, since the apparatus itself constitutes a dark room.

Another object of the invention is to provide a photographing apparatus for enlarging and developing photographs and which is admirably adapted for use by amateur photographers, although, of course, it could be used by others with great advantage.

A further object is to provide a photographing apparatus for enlarging and developing photographs directly in the apparatus and which is relatively simple in construction and highly efficient and convenient in use.

A still further object is to provide in a photographing apparatus such as hereinbefore referred to improved and efficient means for introducing, feeding and positioning in the apparatus the sensitized paper upon which the enlargements are made.

Another object is to provide in photographing apparatus for making enlargements means whereby the enlargements can be efficiently and effectively developed in the apparatus.

A still further object is to provide an apparatus of the character specified and which has provision, if placed in a dark room, for furnishing the room with the red light usually desired in such a place.

Another and further object of the invention is to provide an apparatus such as hereinbefore referred to and which is capable of producing enlargements of different sized films, as desired.

A further important object is to provide an apparatus for making photographic enlargements and developing the same directly in the apparatus and which is so constructed that the degree of exposure to which the sensitized paper has been subjected can be visually determined and controlled from the exterior of the apparatus.

A further object of the invention is to provide a method and apparatus for exposing an enlarged image on a sensitized surface and developing, fixing and processing said image, preferably by solutions atomized thereon, in view of the operator from exteriorly of the apparatus through a safelight window in full daylight and without a dark room.

A still further object is to provide a method and apparatus such that the exposure from the lens can be made concurrently with the application of the developing solutions to the sensitized surface, thus enabling the operator to control and obtain the proper exposure of the image.

A further and additional object is to provide in an apparatus of the character specified, shutter means such that the light exposing the image through the lens can be shut off at will and said light directed through a safelight screen to see the development of the image.

Further and additional objects and advantages not hereinbefore specified will become apparent hereinafter during the following detailed description of embodiments of the invention which are illustrated in the accompanying drawings and wherein:

Fig. 2 is a front to rear vertical sectional view taken substantially on irregular line 2—2 of Fig. 1 looking in the direction of the arrows.

Figure 6:
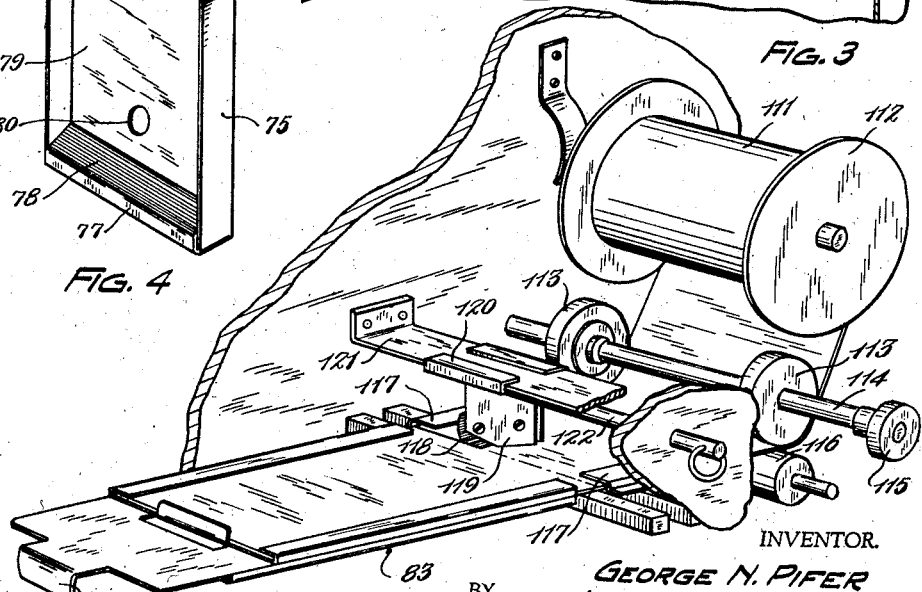

Fig. 6 is a fragmentary perspective view showing a modified form of feeding magazine from that shown before, and wherein the sensitized paper is fed into operative position from a roll of sensitized paper from which is severed that portion of the paper upon which the enlargement is to be made, and Fig. 7 is a fragmentary sectional view of the front side of the photographing compartment but shows a modified form of construction for introducing the developing, fixing and washing solutions from that shown in the previous views.

The apparatus disclosed in Figs. 1 to 5 inclusive comprises a casing indicated generally by the numeral 10 and which casing is formed of suitable material which is light in weight and adapted for such purpose.

The casing 10 comprises a base 11, side walls 12 and 13 and a rear wall 14. The side walls 12 and 13 are reduced in depth from front to rear at the upper part of the apparatus, as clearly indicated in Fig. 2. The upper end of the apparatus is closed by a curved metallic closure element 15 suitably secured to the side walls 12 and 13. A partition 16 extends transversely of the upper end of the apparatus for a portion of the width thereof, see Fig. 1, and partly from the rear wall 14 toward the front of the apparatus, see Fig. 2, and said partition is secured to the side wall 12 and the rear wall 14 and is inclined upwardly from the horizontal, as viewed in the drawings.

A lamp socket 17 is mounted in the upper end of the apparatus by means of a suitable bracket 18 secured to the side wall 13. The socket 17 is provided with an electric light bulb 19 and current therefor is derived from the conduit 20 electrically connected with the socket and bulb and with a suitable source of electrical energy.

The side wall 12 is provided with a plurality of openings 21 for the dissipation of heat created by the bulb 19, while an L-shaped shield 22 is secured to the side wall 12 and serves to protect said wall from the direct effects of the heat of the light bulb and also acts to confine the white light dispensed therefrom to the interior of the apparatus. The horizontal arm of the L-shaped bracket 22 extends transversely of the apparatus and is cut away intermediate its opposite longitudinal edges which are in the form of channels 23. A glass plate 24 is removably positioned in the channels 23, wherefore light from the bulb 19 may pass downwardly of the apparatus although the heat therefrom is baffled.

Access to the bulb 19 and the glass plate 24 is obtained by a removable red glass plate 25 located at the rear of the apparatus and by a hinged cover or door 26 preferably formed of metal and hinged at its upper edge to the lower edge of the closure member 15, as indicated at 27, said door or cover 26 extending across the front of the apparatus from side wall to side wall and downwardly to substantially the vertical middle point of the apparatus or to a point where the reduced upper portions of the side walls terminate. The red glass plate 25 also enables red light to be furnished to a dark room or similar place when the apparatus is placed therein and it is desired to utilize the light from the bulb 19 for such purpose.

The partition 16 is provided with an opening 28 and has fixed to its upper side on opposite sides of said opening 28 parallel inwardly facing channel members 29 in which is removably mounted a plain piece of glass 30.

The side wall 12 at a point just above the upper surface of the partition 16 is provided with a slot 31 through which the film containing the photographs to be enlarged is introduced into the apparatus so as to be positioned on the upper surface of the partition 16 between the channel member 29 beneath the glass plate 30. Although separate or detached photographic film can be positioned in the machine and enlargements made therefrom, there is shown and described herein by way of illustration a continuous ribbon of film, such as a roll of motion picture film 32 located in a U-shaped holder 33 and having its free end passed through a slot in the holder and through the slot 31 in the side wall 12 and beneath the glass plate 30 and over the opening 28, said free end of the film 32 beyond the glass plate 30 extending downwardly into the interior of the apparatus until it engages a transverse partition 34 supported by the side walls 12 and 13 (see Fig. 1). The clearance between the glass 30 and the upper surface of the partition 16 is such that the film may pass therebetween but will be frictionally held in various adjusted positions.

A vertical closure plate 35 is arranged intermediate the partition 16 and the partition 34 and extends from the side wall 12 transversely of the apparatus to the inner end of the partition 16 and constitutes the rear wall of a camera lens compartment as will later become clear. A wall member 36 extending vertically between the partitions 16 and 34 constitutes one side wall of said lens compartment, while the side wall 12 of the apparatus constitutes the other side wall thereof. A removable rabbeted door 37 closes and seals the front of the lens compartment, as clearly indicated in Figs. 1 and 2.

A lens holder and partition 38 can be selectively mounted in parallel receiving channels 38a or 38b secured to side wall 12 and wall member 36. The channels 38a and 38b are located in predetermined positions so that holders 38 equipped with different lenses 39 can be selectively mounted in either the channels 38a or the channels 38b depending on the size of the film 32. In other words, provision is made for the production of the same sized enlargements from films of different size merely by using different lenses and varying the focal length. The lens 39 is located in alignment with the opening 28 and with an opening 40 formed in the partition 34, wherefore the light rays from the bulb 19 pass through the film, said openings and the lens 39 into a photographic and developing chamber, later to be referred to, and produce upon the sensitized paper upon which the enlargement is to be made the photographic image of the film.

Beneath the partition 34 there are two compartments namely, a photographing and developing compartment and a sensitized paper loading or feeding compartment. The photographing and developing compartment is formed of the partition 34 and side wall 12, together with an intermediate wall 41 and bottom wall 42. The front side of the photographic and developing compartment is closed by front wall portions 43 and 44, with the latter portion angularly disposed with respect to the first named portion and inclined toward the front of the apparatus. The front wall portion 44 is provided with a window closed by a piece of red glass 45 and through which the interior of the photographing and developing compartment can be seen and an enlargement being produced therein observed to determine if the same has been exposed sufficiently and correctly developed. The partition 34 at the upper side of the photographing and developing compartment and adjacent the front of the apparatus is provided with an opening 46 over which is a piece of red or other suitable light filtering glass 47, the purpose of which is to provide the compartment with red light when desired.

Figure 1:
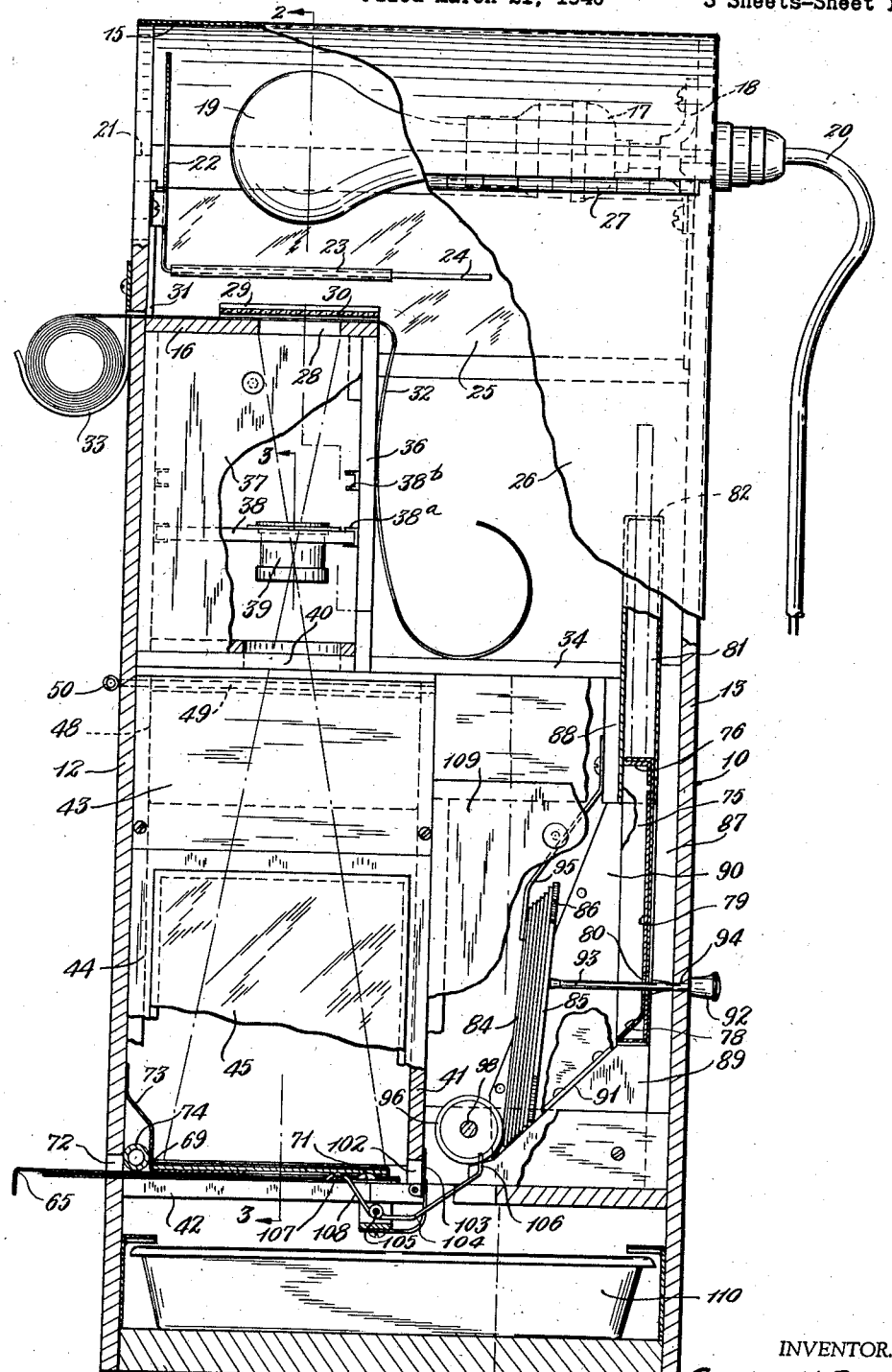
Fig. 1 is a front view of one form of apparatus embodying the invention and is partly in section and partly in elevation, the section being taken on irregular line 1—1 of Fig. 2 looking in the direction of the arrows.
Figures 3, 4:
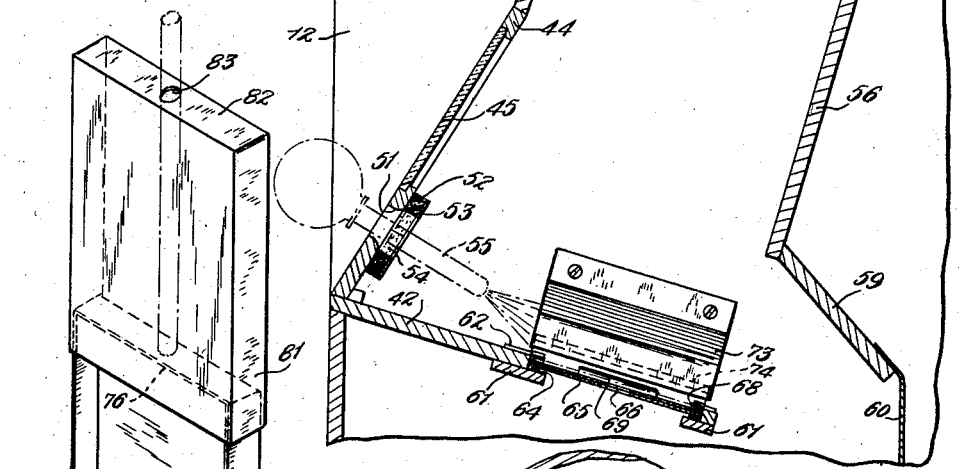
Fig. 3 is a fragmentary front to rear vertical sectional view taken substantially on line 3—3 of Fig. 1 looking in the direction of the arrows.
Fig. 4 is a detached perspective view of the magazine box for the sensitized sheets on which the enlargements are produced, said magazine box being shown in open position.

A plate 48 is hingedly mounted within the photographing and developing compartment adjacent the upper end thereof on an axis extending transversely of the apparatus as indicated at 49 in Figs. 1, 2 and 3, and said plate may be swung by the handle 50 that is located exteriorly of the side wall 12 from a position wherein it underlies the red glass plate 47, or to a position wherein it underlies and closes the opening 40 in the partition 34.

It will be apparent that when the plate 48 underlies the red glass 47 the passage of light from the bulb 19 through the glass 47 and into the photographing compartment is obstructed, while when the plate 48 closes the opening 40 the lens 39 in effect is closed since no light can pass therethrough and into the photographing compartment. More will be stated hereinafter with respect to the function and purpose of the swingable plate or shutter 48.

The front wall portion 44 of the photographing and developing chamber is provided with an opening 51, see Figs. 2 and 3, which is closed by a piece of material, such as sponge rubber 52, held in position on the inner side of the wall portion 44 by a suitable retaining strip 53. The piece of material 52 is provided with a slit 54 but the nature of the material is such that said slit is normally self-closing, wherefore light will not pass through the opening 51 into the photographing chamber.

In the development of the enlargement as will later be referred to more in detail, it is proposed to pass the stem 55 of an atomizing syringe through the slit 54 in the material 52 so that developing, fixing, and washing solutions and the like can be sprayed onto the sensitized paper upon which the enlargement is being produced. It will be seen that when this occurs the material 52 will more or less tenaciously grip the stem 55 to exclude light, but at the same time the stem can be traversed in all directions to enable the particular liquid being sprayed upon the sensitized paper to thoroughly and completely cover the same. Therefore, it will be noted that the material 52 provides a light excluding curtain for the photographing and developing compartment, but through which developing, fixing and washing solutions can be introduced into the compartment, while at the same time daylight or other objectionable light is excluded therefrom.

The rear of the photographing and developing compartment is closed by a wall 56 extending downwardly from the partition 34 but terminating above the bottom wall 42 of the compartment in order to leave an opening through which excess developing, fixing or washing solutions can flow into a discharge pan later to be referred to. It will be noted, however, that because of the baffles 57, 58 and 59 in the rear of the apparatus, and also because of the shield 60 objectionable white light will be prevented from entering the photographing and developing compartment from the rear of the apparatus.

Figure 5:
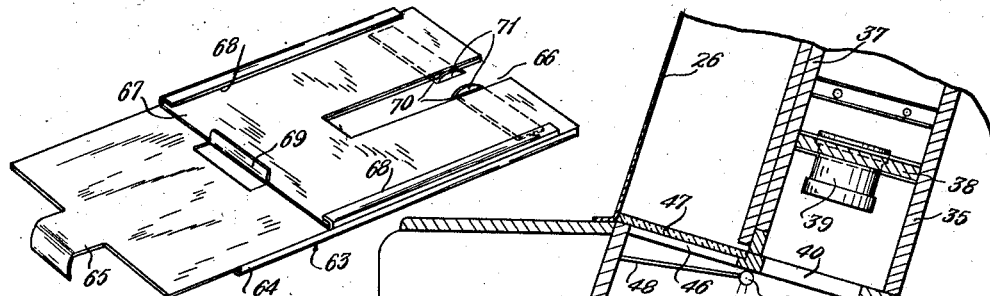
Fig. 5 is a detached perspective view of the loading and positioning plate for the sensitized sheets.

The bottom wall 42 of the photographing compartment is provided with an opening and strips 61 secured on the underside of the wall 42 extend longitudinally of the opening and project laterally beneath the same and form with strips 62 secured to the upper side of the bottom wall 42 and extending longitudinally of the opening, guide channels for a loading and positioning plate indicated generally by the numeral 63 and shown in detail in Fig. 5.

This loading and positioning plate 63 has its opposite longitudinal edges turned inwardly beneath the plate as indicated at 64 to provide thickened edge portions to slide in the guideways formed by the strips 61 and 62, while one end of the plate 63 is provided with a handle 65 and the opposite end with a longitudinally extending slot 66 located centrally of the plate. A secondary plate 67 is secured to the upper side of the plate 63 and is provided with a slot registering with the slot 66. The opposite longitudinal edges of the secondary plate 67 are turned upwardly and inwardly to provide guide channels 68 for a purpose later to be explained, while the left hand end of said plate 67, as viewed in Fig. 5, has formed thereon an upturned stop lug 69 arranged in alignment with the slot 66. Aligned straps 70 are secured to the underside of the plate 63 adjacent one end thereof, and these straps have their ends which extend into the slot 66 formed with upturned camming portions 71, the upper edges of which are of arcuate configuration.

The plate 63, together with its associated parts, is passed into the photographing and developing compartment through a slot 72 formed in the side wall 12 of the apparatus and said plate can be slid backwardly and forwardly in its guideway by means of the handle 65 from the exterior of the apparatus. A shield 73 is secured to the side wall 12 interiorly of the photographing and developing compartment and overhangs the slot 72 and retains in position a roller 74 extending the full length of the slot 72 and which is always in engagement with either the plate 63 of the photographing compartment and serves to exclude light from the photographing compartment or also acts as a stop engageable by the stop lug 69 when the plate 63 has been moved outwardly to position the sensitized paper carried thereby for exposure to the photograph image. It will be noted that the stop lug 69 is slightly curved so that when it is desired to move the same past the roller a slight additional pull will cam said roller upwardly and allow the lug to pass.

The sensitized paper used for making the enlargements may be in the form of a preserved sheet for each enlargement and a stack or supply of these preserved or separate sensitized sheets may be introduced and loaded into the machine from a magazine box such as is shown in Fig. 4.

This magazine box is formed of suitable material, as for example, cardboard or the like, and comprises a container 75 of general rectangular configuration with one end wall 76 thereof straight both exteriorly and interiorly of the container while the other end wall 77 thereof has its inner surface inclined, as indicated at 78, for a purpose later to become apparent. The bottom wall 79 of the container is provided adjacent the end wall 77 with a centrally located opening 80, the purpose of which will later be explained. The magazine is provided with a cover 81 which telescopes upon the container 75 and the closed end 82 of the cover is provided with a centrally located opening 83.

A plurality of the presevered or separate sensitized sheets 84, together with a stiffener plate 85, are placed in the container 75, with the stiffener plate 85 adjacent the bottom wall 79 of the container. The corners of the stiffener plate 85 are recessed, as indicated at 86, for a purpose later to be made clear. The container 75 is loaded with the separate sensitized sheets and the stiffener plate in a suitably darkened place and then the cover 81 is telescoped into fully closed position upon the container, at which time the opening 80 in the bottom wall 79 of the container and the opening 83 in the closed end 82 of the cover are closed, respectively, by the cover and the end wall 76 of the container, so that destructive light is excluded from the container.

The magazine box is introduced into the loading and feeding compartment through a slot formed in the partition 34 and is held in vertical position in the compartment by means of a guide strip 87 secured to the inner side of the side wall 13 by a guide strip 88 projecting downwardly from the partition 34 into the loading and feeding compartment and by platform 89 mounted in the compartment on the bottom wall 42. The magazine box is passed through the slot in the partition 34 until the lower or open end of the cover 81 engages the upper end of a U-shaped metallic guide element 90 secured in the compartment with its bottom attached to the downwardly inclined inner side 91 of the platform 89. The operator then inserts a suitable tool, such as a pencil for example, through the opening 83 in the closed end 82 of the cover 81 and pushes downwardly against the wall 76 of the container 75 to move said container downwardly and outwardly of the cover until the end wall 77 of the container engages the flat upper end of the platform 89, as clearly indicated in Fig. 1. The operator then by means of the knob 92 pushes the loading rod 93 inwardly of an opening 94 formed in the side wall 13 of the apparatus and through an opening formed in the guide strip 87 to cause the inner enlarged end of the loading rod 93 to pass through the opening 80 in the bottom wall 79 of the container and engage against the stiffener plate 85 to move said stiffener plate and the separate sensitized sheets in the container downwardly of the inclined surface 78 of the end wall 77 of the container and the inclined surface 91 of the platform 89 until the top sensitized sheet contacts with the angular and downwardly extending spring arm 95 carried by the guide strip 88. It will be noted that in mounting the magazine in the apparatus and in opening the same and moving the sensitized sheets therefrom into the position just explained, said sheets have not been subjected to objectionable and deleterious light.

The lower edge of the upper or innermost one of the sheets 84 is now in contact with a pair of feed rolls 96 formed on sleeves 97 which are fixed to a rotatable shaft 98 in axially spaced relationship, as clearly indicated in Fig. 2.

The shaft 98 is mounted in suitable bearings formed in the front and rear walls of the loading and feeding compartment and said shaft extends forwardly of the apparatus to a point readily accessible to the operator and is provided on its outer end with an operating knob 99. The shaft 98 also projects rearwardly of the rear wall 56 of the feeding and loading compartment and has fixed to its rear end a ratchet wheel 100 which operatively cooperates with a pawl 101 which serves to limit rotation of the shaft 98 to the feeding direction only. When the shaft 98 is turned in the feeding direction the innermost sheet of sensitized paper 84 is moved by the feed rollers 96 toward the photographing compartment. The loading and positioning plate 63 having been fully inserted into the photographing compartment will have its right hand end as viewed in Fig. 1 projecting through an opening 102 in the wall 41 of the photographing compartment and at this time the spring-pressed door 103 which normally closes said opening will be held in the open position by the loading and positioning plate. A stop arm 104 is pivotally mounted at 105 beneath the bottom wall 42 of the photographing compartment and this arm at one side of its pivotal point extends upwardly into the feeding and loading compartment and has a portion 106 that is normally in elevated position between the feed rollers 96 and acts to prevent the innermost sheet of sensitized paper from passing between the feed rollers except when it is desired to load said sheet onto the loading and positioning plate 63. When the loading and positioning plate 63 is fully inserted in the photographing compartment and has its right hand end extending through the opening 102 the inward movement of the plate will have caused the upturned camming portion 71 to have engaged with the lugs 107 formed on the opposite sides of the upper curved end of the portion 108 of the stop arm 104 and which extends through the opening of the bottom 42 of the photographic compartment and the slot 66 of the loading and positioning plate 63, with the result that the stop arm 104 is rocked to move the portion 106 downwardly to allow the innermost sheet of the sensitized paper to pass beneath the feed rolls 96. The feeding rotation of the shaft 98 now causes said sheet of sensitized paper to pass into the channels 68 on the loading and positioning plate 63 until the left hand edge of the sheet engages the stop lug 69. The loading and positioning plate 63 is now moved into approximately photographing position and until the right hand end of said plate passes through the opening 102 and is again located in the photographing compartment. At this time the door 103 is closed by its spring and the loaded sensitized sheet bearing on the portion 108 of the stop arm rocks the latter to cause the portion 106 thereof to again be moved to raised position between the feed rollers 96 to prevent the next sensitized sheet from passing beneath the feed rollers should the shaft 98 be accidentally turned. In case it is necessary to adjust manually the sensitized sheets in the feeding and loading compartment a removable door 109 is provided so that access to said compartment may be had. It will be noted that when the last sensitized sheet is in loading position the loading thereof will not cause the stiffener plate 85 to get caught and drawn beneath the feed rollers, because the corner edges of said plate are recessed as indicated at 86. The purpose of having all four of the corner edges of the stiffener plate recessed is to enable said plate to be positioned in the magazine box so that the recessed corners thereof will always be located at the lower end of the box.

Assuming that a strip of film 32 is in the position indicated in Fig. 1 and that a sensitized sheet has been loaded onto the plate 63 and positioned in the photographing compartment and that the plate or flap 48 is beneath the opening 40, the operator adjusts the strip of film 32 to position over the opening 29 the particular picture he wishes to enlarge. At this time the bulb 19 has been lighted and light therefrom is passing through the red glass 47 and into the photographing compartment. The operator by means of the handle 65 adjusts the plate 63 to position the sensitized paper thereon into the photographing location, after which he turns the handle 50 to swing the plate or flap 48 from beneath the opening 40 to beneath the red glass 47. The light from the bulb 19 then passes through the film and the lens 39 and exposes the sensitized paper to the photographic image. The operator observes through the red glass window 45 the exposure of the image on the sensitized paper and when he determines the paper has been sufficiently exposed he again turns the flap or plate 48 by the handle 50 to move the same beneath the opening 40. The operator by means of a suitable atomizer syringe, the stem of which is passed through the slit 54 in the material 52, atomizes or sprays upon the exposed sensitized paper the developing, fixing and washing solutions and observes through the red glass window 45 the development of the enlargement upon the sensitized paper. In this way the proper development of the enlargement can be visually determined and obtained by the operator.

The operator also may apply the developing solution to the sensitized paper simultaneously with the exposure of the paper to the photographic image and in this way visually observe the reproduction of the image on the sensitized paper and thus determine when the paper has been exposed sufficiently to produce a clear and distinct enlargement.

After the enlargement has been made the operator removes the loading and positioning plate 63 from the photographing and developing compartment by sliding said plate through the opening 72 in the side wall 12 of the apparatus. The excess developing, fixing and washing solutions are free to flow from the developing and photographing compartment into a suitable container 110 located in the bottom of the apparatus and removable therefrom through an opening located in the front wall, as clearly indicated in Fig. 2. In this connection it will be remembered that the bottom wall of the photographing and developing compartment is downwardly inclined toward the rear of the apparatus, wherefore said solutions will readily flow into the container 110.

In the form of apparatus previously described and illustrated in Figs. 1 to 5 inclusive, the sensitized paper upon which the enlargements are made is in the form of separate presevered sheets. In Fig. 6 there is illustrated an arrangement whereby the sensitized paper may be fed into photographing position from a roll of sensitized paper and after a length of the paper has been positioned on the loading plate 63 such length of the paper is severed from the remainder of the ribbon. The ribbon of sensitized paper shown in Fig. 6 and indicated at 111 is in the form of a roll carried by a spool 112 that is rotatably supported in suitable bearing supports in the feeding and loading compartment. The free end of the ribbon passes from the roll and beneath a pair of spaced feed rollers 113 fixed to a feed shaft 114 that carries on its outer or forward end an operating knob 115, said feed rollers and shaft corresponding generally to the feed rollers 96 and shaft 98 previously described. A guiding and tensioning idler roller 116 is mounted beneath the ribbon and the feed rollers 113 and serves to maintain the necessary tension on the ribbon to keep it from wrinkling or allowing slack to occur therein. The free end of the ribbon passes through guide channels 117 located at the opposite longitudinal edges of the ribbon and adjacent to the point at which the predetermined length of the ribbon positioned on the loading plate 63 will be severed from the remainder of the ribbon. For the purpose of severing such length from the remainder of the ribbon a cutting blade 118 is provided and such blade is mounted for cutting movement transversely of the ribbon by means of a blade support 119 extending downwardly from a slide 120 in the form of inwardly facing channels slidably mounted on a slide or guide bar 121. The slide 120 with its depending support 119 is moved lengthwise of the guide bar 121 and transversely of the ribbon or sensitized paper by means of a pull rod 122 connected to the slide and extending forwardly of the apparatus and through an opening in the front wall thereof.

It will be seen that when the cutting blade 118 is in its negative position adjacent the rear of the apparatus rotation of the shaft 114 in the feeding direction will cause the free end of the ribbon to be moved toward the photographing and developing compartment, said free end passing through the channels 117 and into the channels 68 of the loading and positioning plate 63 until the end of the ribbon engages the stop lug 69. The operator then by means of the pull rod 122 moves the blade 118 transversely across the ribbon from rear to front of the apparatus and severs the length of the ribbon on the plate 63 from the remainder of the ribbon, after which the plate 63 is moved by the handle 65 into photographing position.

It will be noted that the channels 117 after the loaded length of ribbon has been severed from the remainder of the ribbon serve to restrain the end of the ribbon from curling or otherwise getting out of alignment with the guide channels 68 of the plate 63.

In Fig. 7 there is illustrated a different arrangement from that previously shown and described for introducing the developing, fixing and washing solutions into the photographing and developing compartment.

The front wall 44 is provided with an opening the circumferential wall of which is concaved, as indicated at 123, to receive a ball 124 on a tube 125 that extends through the opening into the interior of the photographing compartment. Retaining plates 126 are secured to the outer and inner surfaces of the wall 44 adjacent the opening and these plates have portions curved complementary to the ball 124 and which serve to retain the ball in the opening while allowing the same to have a swivel movement therein. The ball 124 and retaining plates 126 exclude harmful light from the compartment.

An atomizing bulb 127 can be connected with the tube 125 by a tapered stem 128 which is inserted into the outer end of the tube. It will be seen that developing, fixing and washing solutions can be sprayed or atomized into the compartment upon a sensitized surface therein and that the tube 125 can be swivelly moved to enable the entire surface to be properly covered.

Although the description heretofore has dealt with the production of enlargements from negative films, it is possible by means of this apparatus to produce enlargements directly from positive films by means of processes which are now known in the art as, for example, that disclosed and claimed in my Patent No. 1,682,931.

It will have been seen that an apparatus embodying the invention is such that photographs can be enlarged and directly developed therein and that the apparatus is so constructed that it is portable and can be positioned in any convenient place to carry out the making of the enlargements and the development thereof, since the apparatus itself constitutes a dark room.

It will also have been noted that the apparatus is especially adapted for use by amateur photographers, that it is capable of producing enlargements of different sized films and that it is so constructed that the degree of exposure to which the sensitized paper has been subjected can be visually determined and controlled from the exterior of the apparatus.

It will further have been observed that the invention contemplates a novel, yet simple, means for loading the sensitized paper into the apparatus and for positioning the same in photographing locating.

Although a specific structure embodying the invention has been illustrated and described herein, it will be understood that the invention is susceptible of various modifications and adaptations within the scope of the appended claims.

Having thus described my invention I claim:

1. An apparatus for enlarging photographs and for developing such enlargements directly therein comprising a casing, camera means therein, means for positioning a photograph in said camera means, a photographing and developing compartment in said casing operatively associated with said camera means, means for feeding a sheet of sensitized paper into photographing position in said compartment, light producing means, means including separate passages and a shutter control therefor for selectively causing the light produced by said last named means to pass through said camera means into the said compartment in the form of photographing light or to pass into said compartment independently of said camera means and in the form of developing light, and means for introducing developing solutions in said compartment and upon said sensitized sheet without admitting deleterious light to said compartment and operable and controllable from the exterior of the casing.

2. An apparatus for enlarging photographs and for developing the same directly therein comprising a casing, camera means therein, means for positioning a photograph in said camera means, a photographing and developing compartment in said casing operatively associated with said camera means, means for feeding a sheet of sensitized paper into photographing position in said compartment, means for directing photographic light through said camera means and said photograph and into said compartment upon said sensitized sheet, means for passing filtered light into said compartment including a passage having therein a light filter, means for selectively rendering one or the other of said last named means ineffective and including a shutter, and means for introducing developing solutions into said compartment and upon said sensitized sheet without the admission of deleterious light to said compartment and operable and controllable from the exterior of the casing.

3. An apparatus for enlarging photographs and for developing the same directly therein comprising a casing, camera means therein including a lens, means for positioning a photograph in said camera means in fixed predetermined relationship to said lens, a photographing and developing compartment in said casing operatively associated with said camera means, means for feeding a sheet of sensitized paper into photographing position in said compartment and in fixed predetermined relationship to said lens, means for passing light through said camera means and said photograph into said compartment and upon said sensitized sheet, and means for introducing developing solutions into said compartment and upon said sensitized sheet without the admission of deleterious light thereto and including an opening in said casing, a disk closing said opening and provided with a slit through which a tube can be inserted, said disk being formed of a material of such character that said slit is normally self-closing.

4. An apparatus for enlarging photographs and for developing the same directly therein comprising a casing, camera means therein including a lens, means for positioning a photograph in said camera means in fixed predetermined relationship to said lens, a photographing and developing compartment in said casing operatively associated with said camera means, a loading and feeding compartment in said casing adjacent said photographing and developing compartment, means for positioning a supply of sensitized paper in said loading compartment, means for feeding sheets of said paper from said loading compartment into said photographing compartment into a fixed predetermined position relative to said lens and operable from exteriorly of the casing, means for passing light through said camera means and said photograph and into said photographing compartment and upon said sensitized sheet, and means for introducing developing solutions into said photographing and developing compartment and upon said sensitized sheet and without the admission of deleterious light and operable and controllable from the exterior of the casing.

5. An apparatus for enlarging photographs and for developing such enlargements directly therein comprising a casing, camera means therein including a lens, means for positioning a photograph in said camera means in fixed predetermined relationship to said lens, a photographing and developing compartment in said casing operatively associated with said camera means, a loading and feeding compartment in said casing adjacent said first named compartment, means for positioning a supply of presevered separate sheets of sensitized paper in said loading compartment, means operable from exteriorly of the casing for successively feeding the sheets of sensitized paper into photographing position in said photographing compartment and in fixed predetermined relationship to said lens, means for passing light through said camera means and said photograph and into said photographing compartment and upon said sensitized sheet, and means for introducing developing solutions into said compartment and upon said sensitized sheet without admitting deleterious light thereto and operable and controllable from the exterior of the casing.

6. An apparatus for enlarging photographs and for developing such enlargements directly therein comprising a casing, camera means therein including a lens, means for positioning a photograph in said camera means in fixed predetermined relationship to said lens, a photographing and developing compartment in said casing operatively associated with said camera means, a loading and feeding compartment in said casing adjacent said first named compartment, means for positioning a roll of sensitized paper in said loading and feeding compartment, means operable from exteriorly of the casing for feeding a length of said sensitized paper into said photographing compartment and into fixed predetermined relationship to said lens, means for severing said length of said sensitized paper from said roll, means for passing light through said camera means and said photographing compartment and upon said length of sensitized paper, and means for introducing developing solutions into said compartment and upon said length of said sensitized paper without admitting deleterious light thereto and operable and controllable from exteriorly of the casing.

7. An apparatus for enlarging photographs and for devoloping the same directly therein comprising a casing, camera means therein, means for positioning a photograph in said camera means, a photographing and developing compartment in said casing operatively associated with said camera means, means for feeding a sheet of sensitized paper into photographing position in said compartment, means for directing photographic light through said camera means and said photograph and into said compartment upon said sensitized sheet, means for passing filtered light into said compartment and including a passage having a light filter therein, a movable shutter operable from exteriorly of the casing for selectively rendering ineffective one or the other of said two last named means, and means for introducing developing solutions into said compartment and upon said sensitized sheet without the admission of deleterious light to said compartment.

8. An apparatus for enlarging photographs and for developing the same directly therein comprising a casing, camera means therein, means for positioning a photograph in said camera means, a photographing and developing compartment in said casing operatively associated with said camera means, a loading and feeding compartment in said casing adjacent said photographing and developing compartment, means for positioning a supply of presevered sensitized paper sheets in said compartment and including a magazine in the form of a container provided with an opening and a rod operable from the exterior of the casing and passing through an opening in the wall thereof aligned with said opening in said container and having its inner end engaging the supply of sensitized paper in said container, means for feeding said sheets from said container into said photographing compartment and operable from exteriorly of the casing, means for passing light through said camera means and said photograph and into said photographing compartment and upon a sensitized sheet therein, and means for introducing developing solutions into said photographing and developing compartment and upon said sensitized sheet and without the admission of deleterious light.

9. An apparatus for enlarging photographs and for developing the same directly therein comprising a casing, camera means including a lens, means for positioning a photograph in said camera means in fixed predetermined relationship to said lens, a photographing and developing compartment in said casing operatively associated with said camera means and sealed against the admission of deleterious light, means for feeding a sheet of sensitized paper into photographing position in said compartment and into fixed predetermined relationship to said lens, means for exposing said sheet to said photograph, and means for introducing developing solutions into said compartment and upon said sensitized sheet and including a tube extending from exteriorly of the compartment into the same and swivelly supported in a wall thereof, and an atomizer operatively connected to said tube.

GEORGE N. PIFER.